United States Patent
Yu et al.

(10) Patent No.: US 12,030,388 B2
(45) Date of Patent: Jul. 9, 2024

(54) REGENERATIVE BRAKING TORQUE CONTROL SYSTEM FOR LAUNCH CLUTCH OPENING

(71) Applicant: ZF Active Safety US Inc., Livonia, MI (US)

(72) Inventors: Wenbo Yu, Canton, MI (US); Tobias Kranepuhl, Friedrichshafen (DE)

(73) Assignee: ZF Active Safety US Inc., Livonia, MI (US)

( * ) Notice: Subject to any disclaimer, the term of this patent is extended or adjusted under 35 U.S.C. 154(b) by 616 days.

(21) Appl. No.: 17/200,958

(22) Filed: Mar. 15, 2021

(65) Prior Publication Data
US 2022/0289043 A1  Sep. 15, 2022

(51) Int. Cl.
  *B60L 15/20*  (2006.01)
  *B60L 7/18*  (2006.01)

(52) U.S. Cl.
  CPC .............. *B60L 15/2009* (2013.01); *B60L 7/18* (2013.01); *B60L 2240/421* (2013.01); *B60L 2240/486* (2013.01); *B60L 2240/507* (2013.01); *B60L 2260/44* (2013.01)

(58) Field of Classification Search
  None
  See application file for complete search history.

(56) References Cited

U.S. PATENT DOCUMENTS

| | | | |
|---|---|---|---|
| 9,187,081 B2 | 11/2015 | Dai et al. | |
| 10,899,351 B2 | 1/2021 | Smyczynski et al. | |
| 2015/0105214 A1* | 4/2015 | Wang | B60W 10/08 477/4 |
| 2015/0375747 A1* | 12/2015 | Shishido | B60W 10/10 701/48 |
| 2018/0141557 A1* | 5/2018 | Nefcy | B60K 6/48 |

* cited by examiner

*Primary Examiner* — Todd Melton
*Assistant Examiner* — Jason R Roberson
(74) *Attorney, Agent, or Firm* — Kristin L. Murphy

(57) ABSTRACT

A method is provided for controlling regenerative braking for a vehicle having a propulsion system, a motor, a transmission, and a clutch selectively coupling the motor to the transmission. The method includes estimating a future time at which the clutch disengages from the transmission. A rotational speed at which the clutch disengages from the transmission is calculated based on an idle speed of the propulsion system. A difference between a speed of the motor and the clutch disengage speed is monitored. A ramp down of regenerative torque on the motor is initiated when the difference is below a predetermined value and before the future clutch disengage time elapses.

22 Claims, 7 Drawing Sheets

REGENERATIVE BRAKING TORQUE CONTROL SYSTEM FOR LAUNCH CLUTCH OPENING

TECHNICAL FIELD

The present invention relates to braking systems and, in particular, relates to braking systems that actively ramp down regenerative braking in anticipation of clutch opening.

BACKGROUND

Blended regenerative braking requirements include requesting regenerative torque as much as possible to improve fuel efficiency. That said, it is desirable to maintain drivability and keep noise, vibration, and harshness (NVH) at a minimum level during torque blending.

SUMMARY

In one example, a method is provided for controlling regenerative braking for a vehicle having a propulsion system, a motor, a transmission, and a clutch selectively coupling the motor to the transmission. The method includes estimating a future time at which the clutch disengages from the transmission. A rotational speed at which the clutch disengages from the transmission is calculated based on an idle speed of the propulsion system. A difference between a speed of the motor and the clutch disengage speed is monitored. A ramp down of regenerative torque on the motor is initiated when the difference is below a predetermined value and before the future clutch disengage time elapses In another example, a method is provided for controlling regenerative braking for a vehicle having a propulsion system, a motor, a transmission, and a clutch selectively coupling the motor to the transmission. The method includes detecting a down shift of the vehicle and enabling regenerative torque ramp down of the motor in response thereto. A future time at which the clutch disengages from the transmission is estimated. A rotational speed at which the clutch disengages from the transmission is calculated based on an idle speed of the propulsion system. A difference between a speed of the motor and the clutch disengage speed is monitored. A ramp down of regenerative torque on the motor is initiated when the difference is below a first predetermined value and the future clutch disengage time is below a second predetermined value.

Other objects and advantages and a fuller understanding of the invention will be had from the following detailed description and the accompanying drawings.

DETAILED DESCRIPTION

Figure 1:
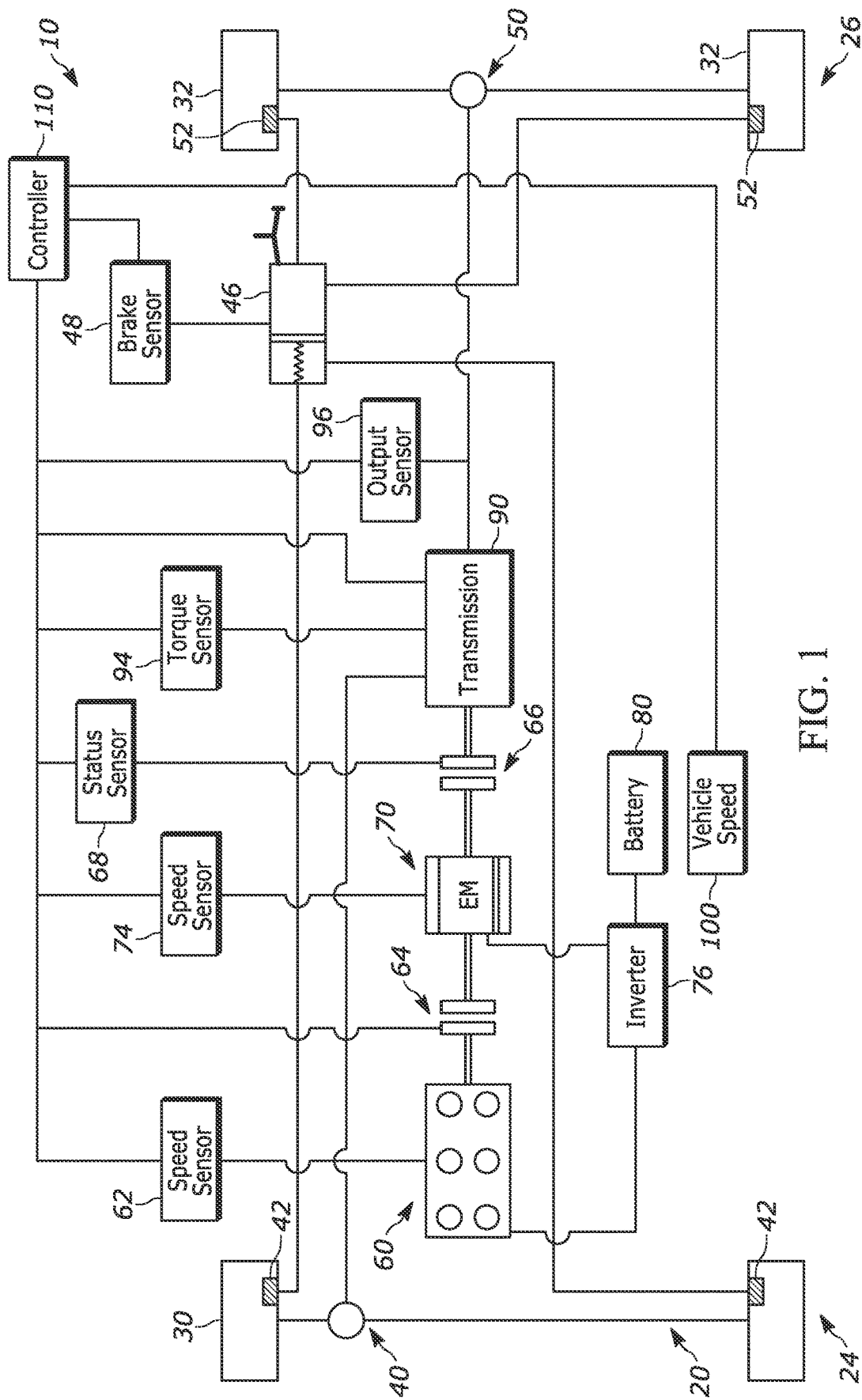
FIG. 1 is a schematic illustration of a vehicle having an example braking system.

The present invention relates to braking systems and, in particular, relates to braking systems that actively ramp down regenerative braking in anticipation of clutch opening. FIG. 1 illustrates an example braking system 10 for a motor vehicle 20 in accordance with the present invention. The vehicle 20 can be an electric or hybrid vehicle. The vehicle 20 can be manually driven or autonomous. Certain components of the vehicle 20 (including the driveline/drivetrain) and braking system 10 are shown and described in U.S. Pat. No. 10,899,351, the entirety of which is incorporated herein by reference. In this interest of brevity, however, only portions of the vehicle and braking system described therein are reproduced here.

The vehicle 20 extends from a first or front end 24 to a second or rear end 26. A pair of steerable wheels 30 is provided at the front end 24. The wheels 30 are driven and steered by a linkage 40. A friction brake 42 is associated with each wheel 30 for braking the same. A pair of wheels 32 is provided at the rear end 26. The wheels 32 are driven and steered by a linkage 50. A friction brake 52 is associated with each wheel 32 for braking the same. The friction brakes 42, 52 can be part of a hydraulic brake system (not shown).

A brake pedal simulator 46 or brake pedal (not shown) is provided for controlling the timing and degree of vehicle 20 braking. A sensor 48 is connected to the brake pedal simulator 46 and monitors the displacement and acceleration of the brake pedal simulator.

A propulsion system 60 cooperates with an electric motor 70 for supplying torque to the front wheels 30 via the linkage 40. The propulsion system 60 and motor 70 can also apply torque to the rear wheels 32 via the linkage. That said, the vehicle 20 can be configured to operate either in electric vehicle mode or hybrid mode. The propulsion system 60 can therefore include an electric motor (in the case of a fully electric vehicle) and/or an engine (in the case of a hybrid vehicle).

In either case, a speed sensor 62 is connected to the propulsion system 60 and monitors the output speed thereof. Similarly, the motor 70 is connected to a speed sensor 74 that generates signals indicative of the motor speed. The motor 70 is also connected to an inverter 76, which is connected to a battery 78 on board the vehicle 20. The battery 78 supplies power to the motor 70 for operation thereof.

A transmission 90 is provided between the motor 70 and linkages 40, 50 for determining the gear ratio therebetween. In one example, the transmission 66 is an eight speed transmission, although any multi-gear transmission is contemplated. A torque sensor 94 is connected to the transmission 90 and generates signals indicative of the transmission torque ratio between the fly wheel and the transmission output flange (not shown). An output speed sensor 96 is connected to the transmission 90 and generates signals indicative of the output speed of the transmission.

A pair of clutches 64, 66 help to mechanically couple the propulsion system 60 and motor 70 to the transmission 90. To this end, the clutch 64 selectively couples the propulsion system 60 to the motor 70. The clutch 66 is an integrated launch element (ILE) connected to the output of the motor 70 and an input of the transmission 90. The ILE 66 is controllable to selectively couple and decouple the motor 70 and transmission 90 from one another. A closed ILE 66 allows the propulsion system 60 and the motor 70 to transfer torque to the transmission 90. An open ILE 66 severs the mechanical link between the propulsion system 60/motor 70 and the transmission 90. A sensor 68 is connected to the ILE 66 and produces a signal indicative of the status of the ILE, e.g., closed, slipping, opening and open.

A controller or control system 110 is provided for helping control operation of the vehicle 20, including operation of the clutch 64, ILE 66, propulsion system 60, motor 70, transmission 90, and vehicle braking, including operating the brakes 42, 52. To this end, the control system 110 can include one or more controllers, such as a transmission controller, propulsion system controller, motor controller, and/or brake controller. That said, the control system 110 is connected to and receives signals from the sensors 48, 62, 68, 74, 94, 96. A vehicle speed/acceleration sensor 100 monitors the vehicle speed and acceleration and generates signals indicative thereof. The sensor 100 is also connected to the control system 110.

During normal driving of the vehicle 20, both the clutch 64 and the ILE 66 are closed such that the propulsion system 60 and motor 70 transfer torque to the transmission 90 to propel the vehicle. The control system 110 automatically change gears as needed when the vehicle 20 accelerates and decelerates. The ILE 66 remains closed as long as the vehicle 20 speed is at or above a predetermined value sufficient to prevent the propulsion system 60 from stalling. When the vehicle 20 speed falls below the predetermined value, the control system 110 opens the ILE 66 to decouple the motor 70 from the transmission 90.

When braking is desired, the motor 70 will supply the primary braking force to the wheels 30 so long as the ILE 66 is closed. To this end, when the control system 110 senses movement of the brake pedal simulator 46, the torque demand is removed from the propulsion system 60. At the same time, natural deceleration of the wheels 30 due to friction with the road creates a reaction or regeneration torque that causes the motor 70 to rotate.

This rotation induces a current in the motor 70, which is delivered through the inverter 76 to the battery 78. It will be appreciated that the current normally supplied to the motor 70 stator during torque supply will be cut off during braking to enable power generation and flow back to the battery 78. Consequently, braking energy that is otherwise lost to friction when traditional brakes are used is at least partially recovered and stored in the battery 78 for later use.

Eventually, the vehicle 20 speed will be reduced to a point where the regenerative torque of the motor 60 is insufficient to adequately brake the vehicle. When this occurs, the control system 110 cooperates with the friction brakes 42, 52 to supplement and ultimately replace the regenerative braking until the vehicle 20 comes to a complete stop. In other words, the control system 110 ensures that the combined regenerative torque and friction torque are capable of stopping the vehicle 20 in a timely manner. This concept is known as blended braking.

As noted, when the vehicle 20 speed is at or below the predetermined speed, it is desirable to open the ILE 66 to prevent stalling of the propulsion system 60. Opening the ILE 66 at this time, however, can leave a large residual regenerative torque on the motor 70, thereby inducing noise, vibration, and harshness (NVH) into the vehicle 20 and resulting in an undesirable feeling by the occupants.

Figure 2:
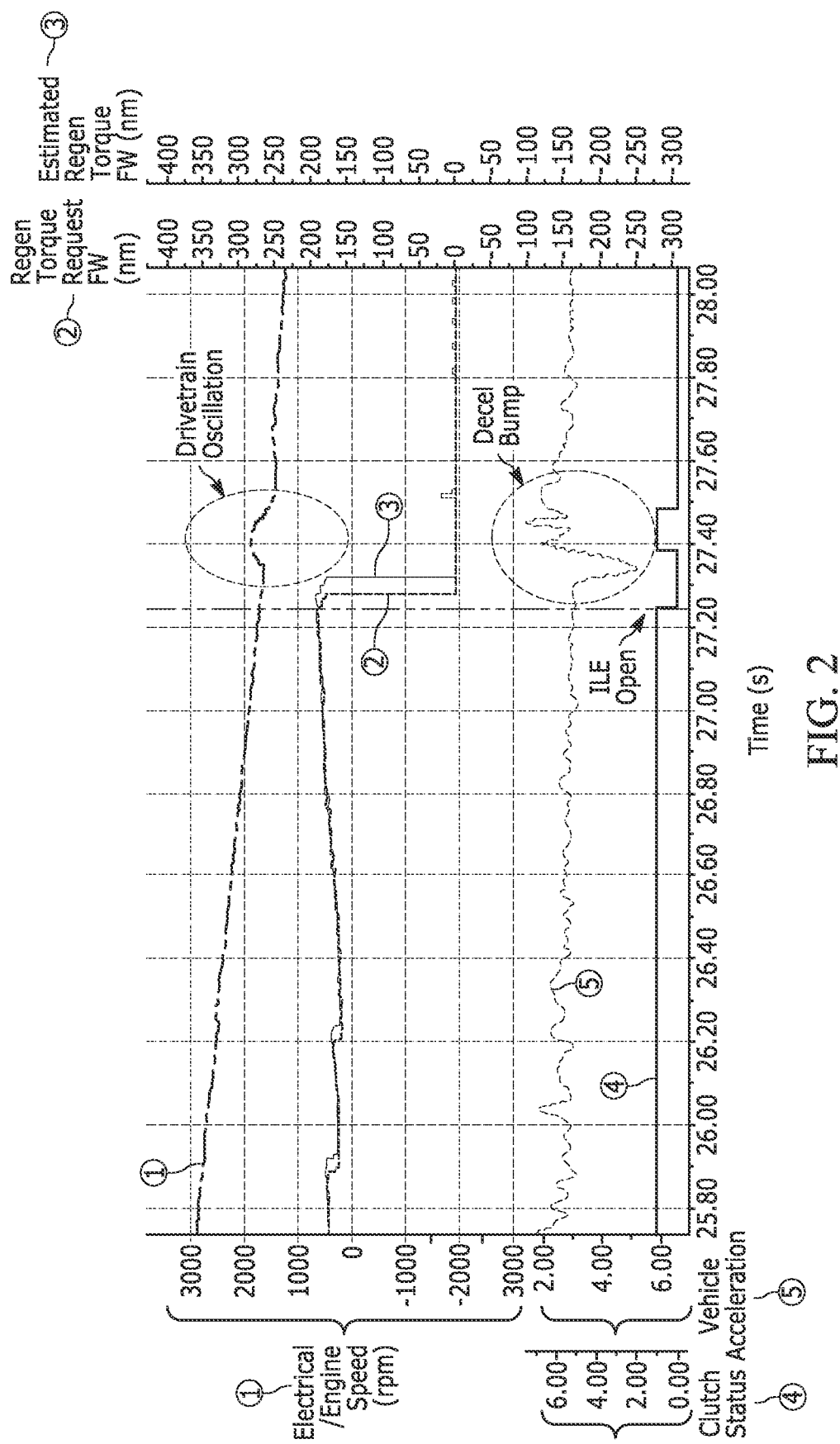
FIG. 2 is a graph illustrating drivetrain oscillation during clutch opening.

FIG. 2 illustrates this phenomenon. As shown, the ILE 66 is opened at the 27.2 second mark. At this time, the regenerative torque of the motor 70 on the ILE 66 is as high as 180 NM when the ILE opens. As a result, the speed of the motor 70 bumps up immediately after the ILE 66 opens and at the same time the vehicle 20 acceleration oscillates, which causes the NVH.

That said, reducing or eliminating this residual torque would allow the ILE 66 to open smoothly with reduced or alleviated NVH. To achieve this, the braking system 10 of the present invention reduces or ramps out the regenerative torque of the motor 70 prior to opening the ILE 66. In particular, the control system 110 acquires the signals/data indicative of, for example, the motor speed and gradient from the motor speed sensor 74, the transmission torque ratio from the torque sensor 94, the current gear and target gear known, the transmission output speed from the sensor 96 and/or the vehicle mode, e.g., electric vehicle mode, hybrid mode or transition therebetween.

The control system 110 can also rely on a calculated ILE disengage speed. When the motor speed is lower than this threshold, the ILE 66 must open to prevent stalling of the propulsion system 60. The ILE disengage speed is based on the idle speed of the propulsion system 60 plus a dynamic offset that depends on the target gear and transmission output speed gradient. As the vehicle 20 deceleration increases, the ILE disengage speed rises to ensure that the ILE 66 opens before the motor speed gets close to the propulsion system 60 idle speed to avoid stalling. The braking system 10 of the present invention advantageously extends regenerative torque as long as possible and ensures that it is ramped out to a level that will mitigate any NVH while the ILE 66 opens.

Figure 3:
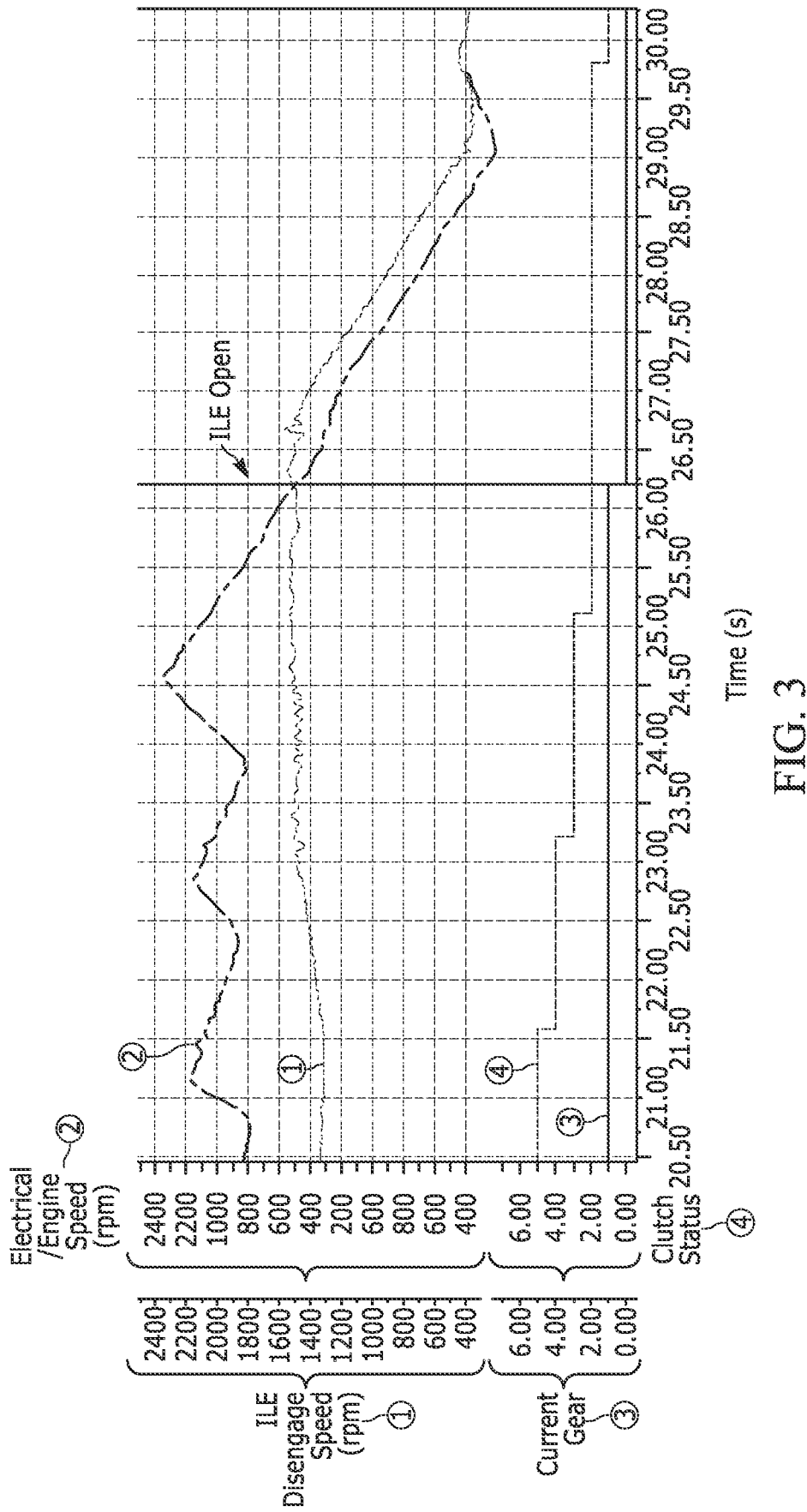
FIG. 3 is a graph illustrating opening of the clutch depending on motor speed.

Referring to FIG. 3, the motor speed and ILE disengage speed are both plotted over time. During operation of the braking system 10, the ILE disengage speed is tracked/plotted and an offset, e.g., 300 rpm, is added to the tracked value. Greater or lesser offsets are also contemplated. Depending on the torque ramp down rate calibration, the 300 rpm offset can be calibrated according to the time needed to ramp down the regenerative torque. In any case, once the motor speed is below the ILE disengage speed plus the offset, normally the ramp down of the regeneration torque could begin.

Figure 4:
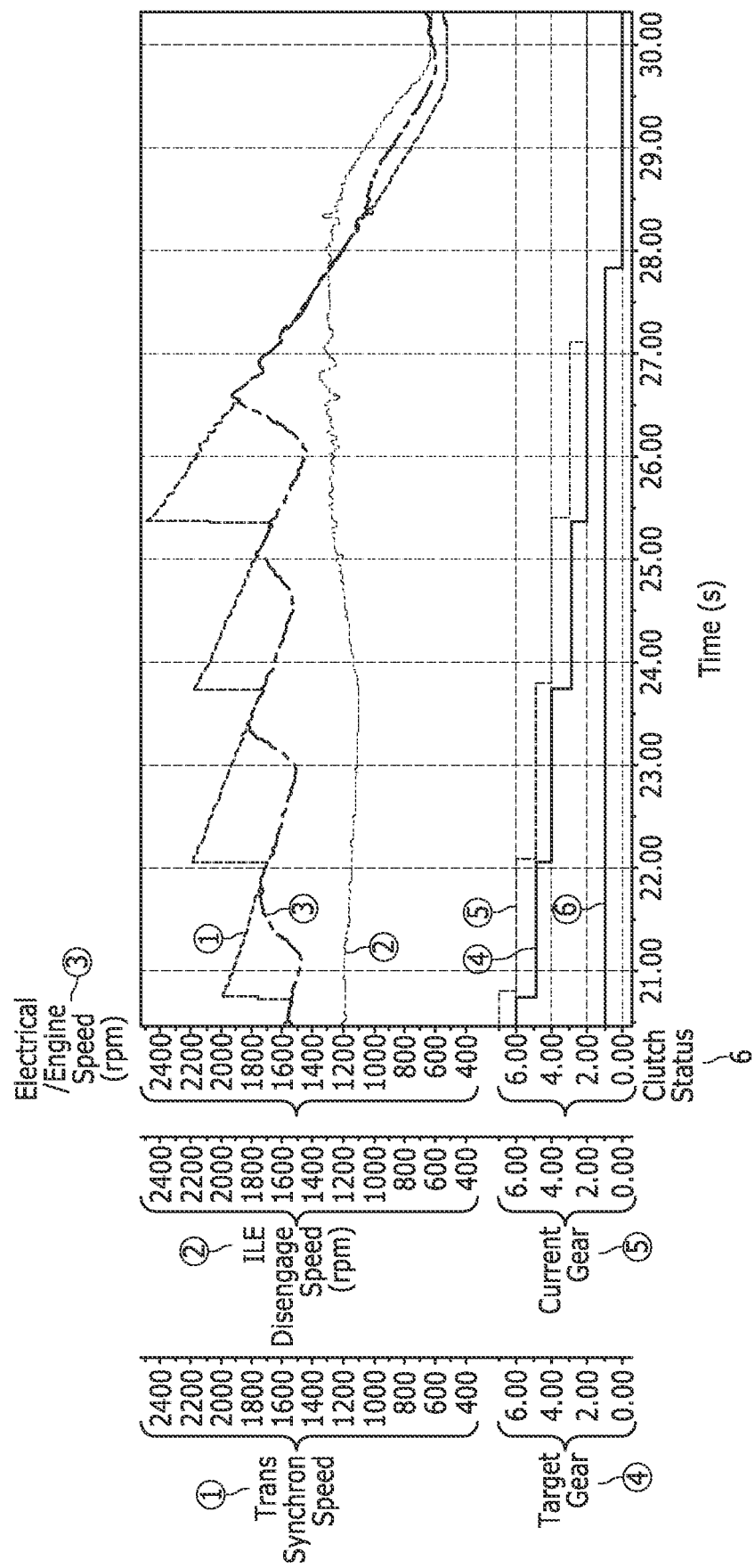
FIG. 4 is a graph illustrating calculation of a transmission synchronous speed.

An issue with this approach, however, is that during a transmission 90 down shift the motor speed can become very close to the ILE disengage speed. This can cause the control system 110 to inaccurately trigger ILE 66 opening and initiate regenerative torque ramp down. To alleviate this concern, the control system 110 is configured to detect down shifts and control ILE 66 opening and ramp down accordingly. To this end, a transmission synchronous speed is calculated by the control system 110 by multiplying the transmission output speed from the sensor 96 by the target gear ratio. The transmission synchronous speed is illustrated in FIG. 4 and plotted along with the motor speed and ILE disengage speed over time. The target transmission gear, current gear, and clutch settings are also plotted over time.

With this in mind, the down shifts begin each time the synchronous speed sharply rises, e.g., just after 22.00 seconds. The down shift process for each gear is indicated by the negatively sloped synchronous speed trend between sharp rises. That said, FIG. 4 illustrates a down shift from seventh to second gear. During each/all down shifts, the motor speed is below the synchronous speed. A positive torque intervention in supplied by the control system 110 to bring up the motor speed to the synchronous speed, at which point the down shift finishes. In other words, the down shift finishes where the two traces lines of the motor speed and synchronous speed overlap in FIG. 4.

Since down shifting is now known and tracked, the control system 110 does not enable or initiate regenerative torque ramp out based solely on when motor speed is less than the synchronous speed during a down shift. This is true even when the motor speed falls within 300 rpm above the ILE disengage speed. In other words, tracking and predicting shifting allows the control system 110 to rely on a wider range of conditions/variables when deciding whether to open/close the ILE 66.

Figure 5:
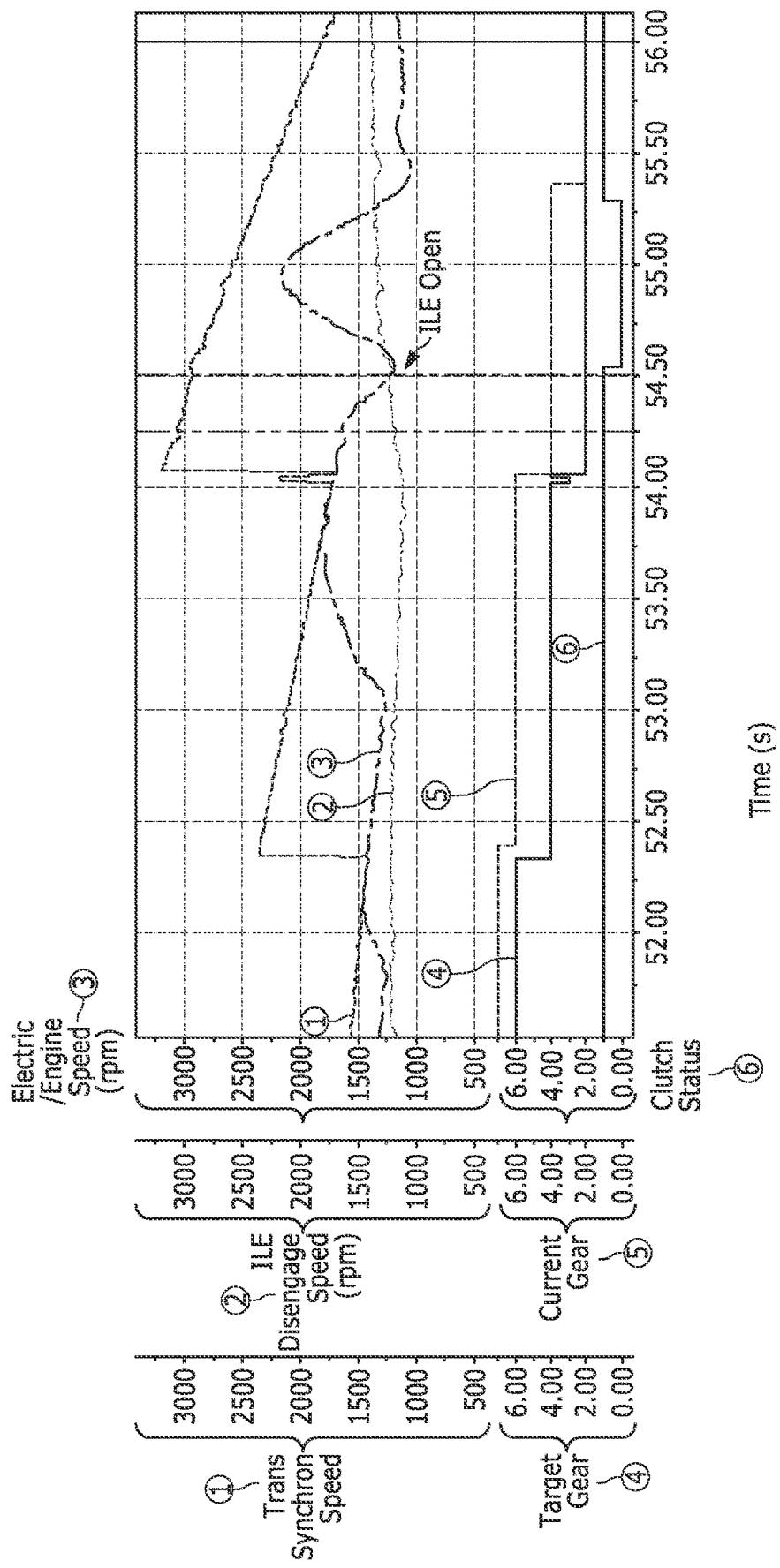
FIG. 5 is a graph illustrating motor speed during gear shifting.

In some situations, however, the motor speed cannot be brought up to the synchronous speed before it crosses the ILE disengage speed and, thus, the ILE 66 is normally forced to open in this situation (see FIG. 5). The forced ILE 66 opening can be caused by, for example, the down shift taking too long or a sudden deceleration increase by the vehicle. As evidenced by FIG. 5, during a 4-2 gear shift the motor speed decelerates faster than previous downshifts at about the 54.25 second mark. This results in the motor speed crossing the ILE disengage speed at the 54.5 second mark. In this scenario, the ILE 66 is forced open at this time. As previously mentioned, normally regenerative torque is not permitted to ramp down during an active down shift. In this situation, however, ramp down is needed to help prevent stalling out as the vehicle 20 rapidly decelerates.

That said, to ramp down the regenerative torque in time, the motor speed gradient is monitored during down shifts. In most down shifts, the motor speed gradient remains constant in most situations. If, however, an increasing negative motor speed gradient is detected, the likelihood that the ILE 66 will be forced open relatively soon is high and, thus, it is desirable to begin ramp down. The illustrated downshift, however, is capable of finishing in time before forcing the ILE 66 open. In this situation, the regenerative torque can be slowly ramped back up as the motor speed diverges upwards from the ILE disengage threshold.

Given these variables and inherent uncertainly of whether a down shift can finish before forcing the ILE 66 open, the braking system 10 can use a more complex approach to ramp down regenerative torque. By tracking the motor speed, motor speed gradient, and ILE disengage speed the time before the motor speed value equals the ILE disengage speed can be calculated. In other words, the future time at which the ILE 66 is forced to open can be calculated based on sensed vehicle 20 condition. This time is calculated dynamically as the motor speed changes as evidenced by the following formula:

$$TimeUntilILEOpen = \frac{(MotorSpeed - ILEDisengagedSpeed)}{-MotorSpeedGradient}$$

Figure 6:
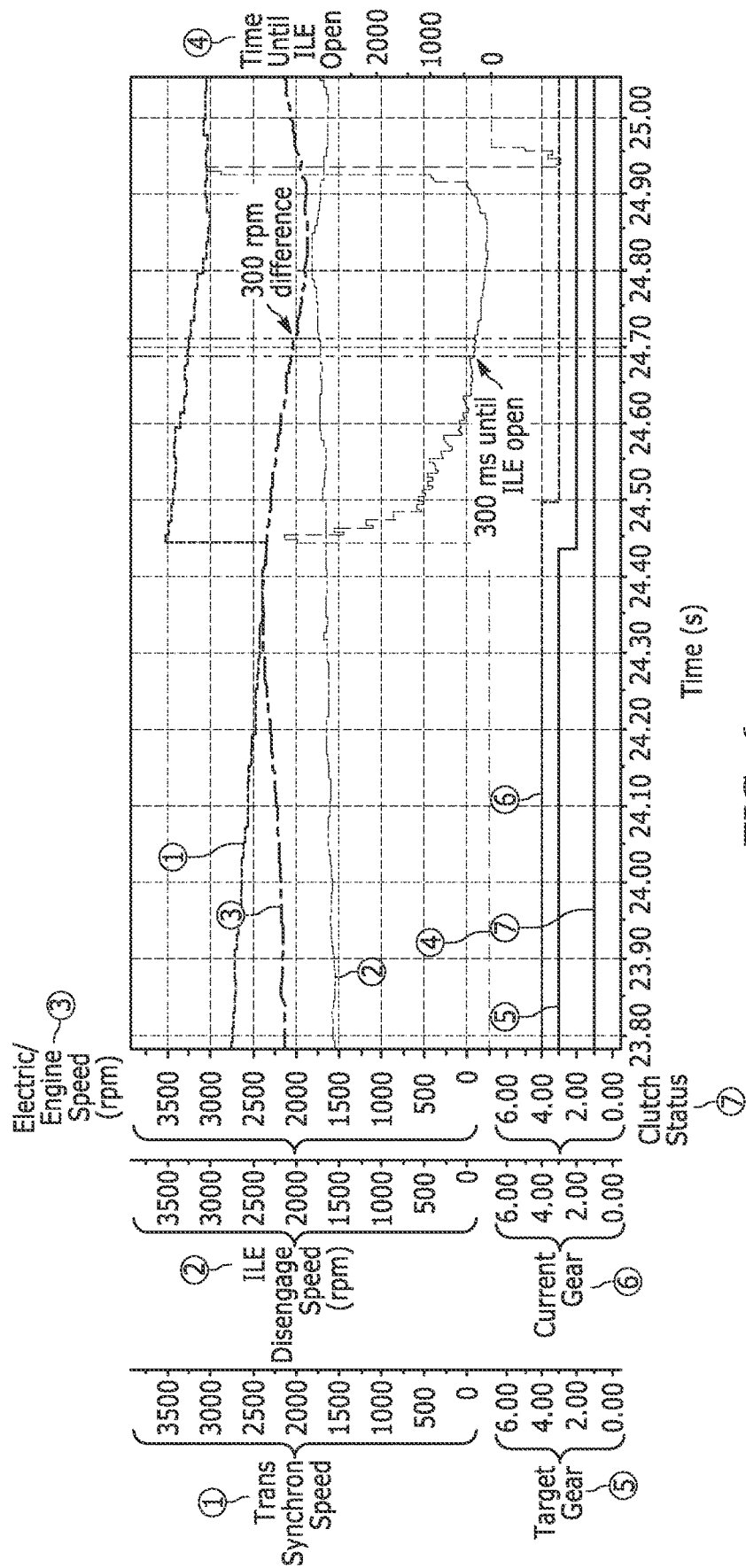
FIG. 6 is a graph illustrating calculating when the clutch will open.

FIG. 6 illustrates plots of the TimeUntilIleOpen ($ILE_{OPEN}$), synchronous speed, ILE disengage speed, and motor speed over time. When $ILE_{OPEN}$ is less than a threshold value, e.g., 300 milliseconds, the likelihood that the shift does not finish prior to forcing the ILE 66 open is high. One instance where calculating the $ILE_{OPEN}$ is desirable is during a 3-2 down shift. Due to the bigger gear ratio difference between the third and second gear, this particular shift takes longer compared to other shifts and therefore is prone to not being able to finish before forcing the ILE 66 open.

As noted, regenerative torque ramp down is normally not permitted at all during an active down shift in normal situations. In this situation, however, the ramp down strategy is enabled. In other words, even when a shift is actively occurring if the calculated $ILE_{OPEN}$ at that time is within the threshold value ramping down the torque is permitted. Once enabled, and similar to the typical ramp down strategy discussed above, the control system 110 monitors the difference between the motor speed and the ILE disengage speed (plus a 300 rpm offset). If the motor speed falls below/within the offset from the ILE disengage speed, regenerative torque ramp down begins.

In the particular case shown in FIG. 6, the 3-2 down shift begins just prior to the 24.45 mark. $ILE_{OPEN}$ is calculated during the 3-2 shift and reaches the 300 ms threshold just prior to the 24.7 second mark, at which point regenerative torque ramp down is enabled. Just after the 24.7 second mark, the difference between the motor speed and the ILE disengage speed falls below the 300 rpm offset and, thus, regenerative torque ramp down begins. It is worth nothing that in example of FIG. 6, the 3-2 shift has actually finished, but the motor speed, at its lowest point, is very close to the ILE disengage speed. Ramping out regenerative torque may have helped finish the shift.

The braking system 10 can be configured to adjust the aforementioned ramp out strategies in emergency situations that cover very rare ILE 66 opening scenarios that may not be covered by the scenarios described above. The ramp down strategy is similar to that discussed above with one exception being that the offset between the motor speed and the ILE disengage speed is lowered, e.g., to about 20 rpm. That said, if the motor speed is within 20 rpm of the ILE disengage speed—regardless of whether a down shift is actively occurring—the regenerative torque is ramped out as soon as possible as it is presumed in this situation that ILE 66 opening is imminent.

Figure 7:
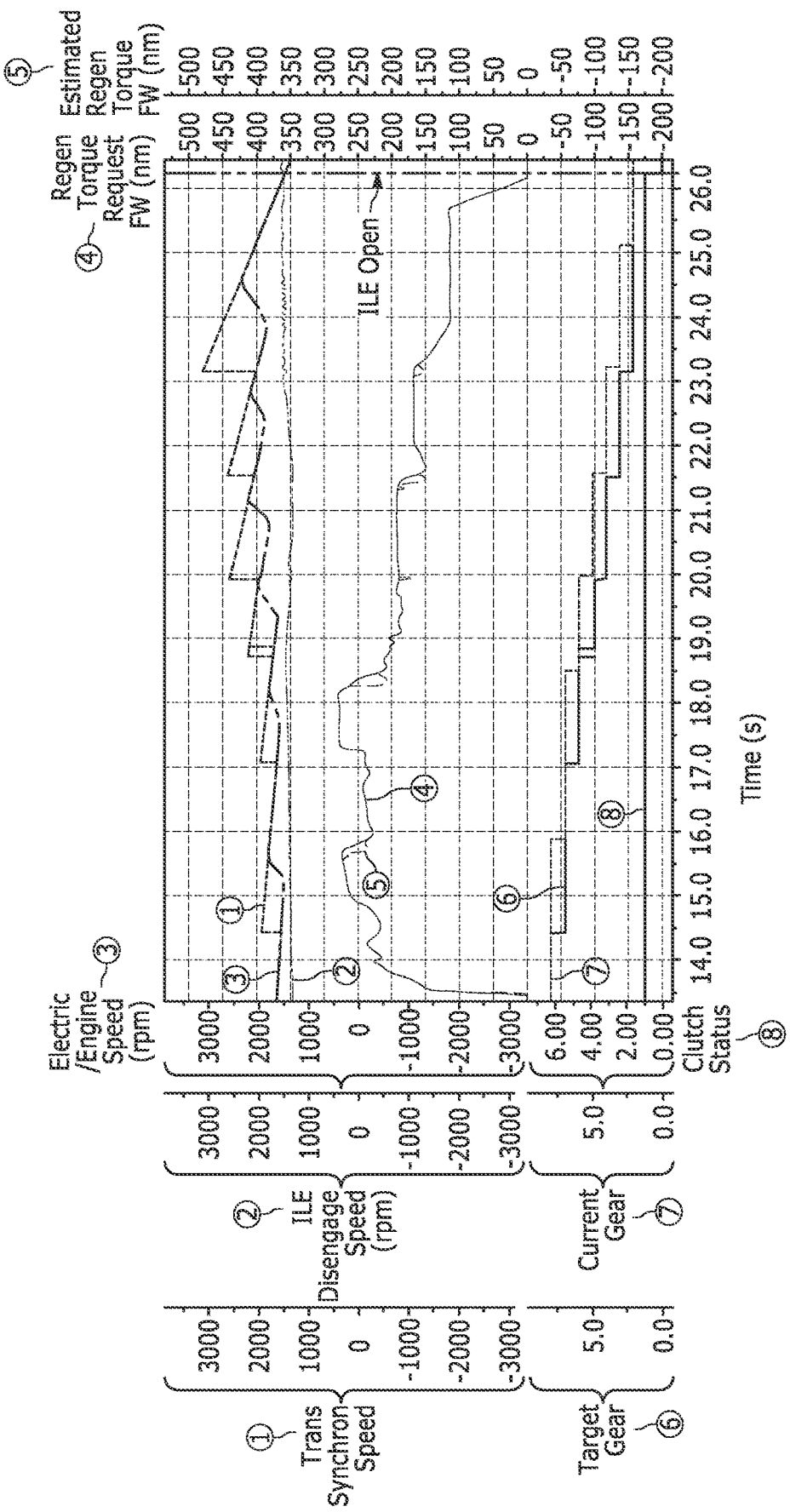
FIG. 7 is a graph illustrating ramping out motor torque before clutch opening.

FIG. 7 shows an example of regenerative torque ramp down before the ILE 66 is fully opened. The braking event starts from the eighth gear. There is no regenerative torque ramp down or fade out during each down shift. The fluctuation on the regenerative torque signals are due to gear ratio and regenerative capacity changes. Once the down shift gets to the second gear, the motor speed falls below the offset of the ILE disengage speed and the regenerative torque is ramped out completely right before the ILE 66 opens.

Additional considerations are taken into account for transitions from electric vehicle mode to hybrid mode. In this situation, the motor speed is below the engine idle speed and, thus, the ILE 66 must open to bring the motor up to the engine speed to synchronize speeds and close the separation clutch between the engine 60 and the motor 70.

When the control system 110 determines that the modes have switched, the ILE disengage speed will be digitally increased due its dependence on the engine idle speed. More specifically, at the point where the control system 110 logic switches to hybrid mode the calculation for the ILE disengage speed considers the engine idle speed and causes the digital jump. This sudden ILE disengage speed increase does not provide the control system 110 enough time to adequately ramp down the regenerative torque using the strategies discussed above.

A logic will therefore be implemented such that the control system 110 considers the engine idle speed only after the transmission input torque is greater than a threshold close to 0 Nm for purposes of calculating the ILE disengage speed for an electric to hybrid mode transition. This logic will allow the control system 110 to command a comfortable regenerative torque ramp down triggered by the hybrid mode transition signal. The ILE 66 will open after the regenerative torque has been ramped out to bring the motor speed up to the propulsion system speed.

The braking system of the present invention provides a control strategy designed to ramp down regenerative torque completely to assist ILE opening. To this end, the control strategy tracks, for example, the electric motor speed, ILE disengage speed, transmission synchronous speed, the ILE-time-to-open, vehicle speed, vehicle deceleration, propulsion system idle speed and/or transmission output. One or more of these variables can be used to time the ramp down of regenerative torque on the electric motor to zero (or about zero) prior to the ILE opening to help mitigate or eliminate NVH while avoiding engine/motor stall out.

It will be appreciated that the braking system of the present invention can be implemented with any driver/operator decoupled braking system including, for example, integrated electro-hydraulic brake apply control units capable of supplying regenerative braking. Non-integrated braking systems are also contemplated for use with the braking system of the present invention.

Moreover, alternative configurations for the driveline are contemplated, including a planetary gear set cooperating with a series of clutches to define a fix gear ratio. In this configuration, the ILE is one of these clutches and it is allowed it to slip in a controlled manner. As a result, during a launch with slip at the launch element several clutches would be closed and one would be slipping until speeds are synchronized.

What have been described above are examples of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A method of controlling regenerative braking for a vehicle having a propulsion system, including a motor, a transmission, and a clutch selectively coupling the motor to the transmission, comprising:
   estimating a future clutch disengage time at which the clutch disengages from the transmission;
   calculating a clutch disengage speed corresponding with a rotational speed at which the clutch disengages from the transmission based on an idle speed of the propulsion system;
   monitoring a difference between a speed of the motor and a sum of the clutch disengage speed plus a dynamic offset; and
   initiating a ramp down of regenerative torque on the motor when the difference is below a predetermined value and before the future clutch disengage time elapses such that the regenerative torque is ramping down when the clutch disengages from the transmission.

2. The method of claim 1, wherein the transmission comprises a multi-speed transmission.

3. The method of claim 1, wherein the future clutch opening time estimates the time before the propulsion system stalls.

4. The method of claim 1, wherein the predetermined value is 300 rpm.

5. The method of claim 1, wherein the predetermined value is 20 rpm.

6. The method of claim 1, wherein the clutch disengage speed is dependent on an idle speed of the propulsion system.

7. The method of claim 1, further comprising detecting a down shift of the vehicle.

8. The method of claim 7, wherein the down shift is detected by calculating a transmission synchronous speed based on an output speed of the transmission and a gear ratio between a current gear and a target gear for the down shift.

9. The method of claim 7, further comprising enabling regenerative torque ramp down prior to initiating the ramp down when a down shift is detected.

10. The method of claim 7, further comprising enabling regenerative torque ramp down prior to initiating the ramp down when a down shift is detected and the future clutch disengage time is within a second predetermined value.

11. The method of claim 10, wherein the second predetermined value is 300 ms.

12. The method of claim 1, wherein the future clutch opening time is based on the motor speed, the clutch disengage speed, and a motor speed gradient.

13. A method of controlling regenerative braking for a vehicle having a propulsion system, including a motor, a transmission, and a clutch selectively coupling the motor to the transmission, comprising:
   detecting a down shift of the vehicle and enabling regenerative torque ramp down of the motor in response thereto;
   estimating a future clutch disengage time at which the clutch disengages from the transmission;
   calculating a clutch disengage speed corresponding with a rotational speed at which the clutch disengages from the transmission based on an idle speed of the propulsion system;
   monitoring a difference between a speed of the motor and a sum of the clutch disengage speed plus a dynamic offset; and
   initiating a ramp down of regenerative torque on the motor when the difference is below a first predetermined value and the future clutch disengage time is below a second predetermined value such that the regenerative torque is ramping down when the clutch disengages from the transmission.

14. The method of claim 13, wherein the future clutch opening time estimates the time before the propulsion system stalls.

15. The method of claim 13, wherein the first predetermined value is 300 rpm.

16. The method of claim 13, wherein the first predetermined value is 20 rpm.

17. The method of claim 13, wherein the clutch disengage speed is dependent on an idle speed of the propulsion system.

18. The method of claim 13, wherein the down shift is detected by calculating a transmission synchronous speed based on an output speed of the transmission and a gear ratio between a current gear and a target gear for the down shift.

19. The method of claim 13, wherein the second predetermined value is 300 ms.

20. The method of claim 13, wherein the future clutch opening time is based on the motor speed, the clutch disengage speed, and a motor speed gradient.

21. The method of claim 13, wherein the dynamic offset depends on a target gear and transmission output speed gradient.

22. The method of claim 1, wherein the dynamic offset depends on a target gear and transmission output speed gradient.

* * * * *